United States Patent [19]

Stern

[11] 4,066,596

[45] Jan. 3, 1978

[54] AEROSOL DISPENSED LATEX PAINT AND PACKAGE CONTAINING THE SAME

[75] Inventor: David Stern, Roslyn, N.Y.

[73] Assignee: Martin Paint & Chemical Corporation, Jamaica, N.Y.

[21] Appl. No.: 541,850

[22] Filed: Jan. 17, 1975

Related U.S. Application Data

[63] Continuation-in-part of Ser. No. 168,916, Aug. 4, 1971, abandoned.

[51] Int. Cl.$^2$ .......................... C08J 3/20; C09D 5/02; C09D 9/04
[52] U.S. Cl. ................................. 260/29.6 R; 222/95; 260/29.6 MM; 260/29.6 MH; 260/42.54; 260/42.55
[58] Field of Search ................... 260/29.6 MM, 29.6 R

[56] References Cited

U.S. PATENT DOCUMENTS

| | | | |
|---|---|---|---|
| 2,953,284 | 9/1960 | Prussin et al. | 222/394 |
| 3,370,024 | 2/1968 | Grasko et al. | 260/3.5 |
| 3,488,308 | 1/1970 | Colbert et al. | 260/23 |

OTHER PUBLICATIONS

Paint Industry Processing & Materials Manual, (1966), RCH Publications, New Kingston, Pa., p. 50.

*Primary Examiner*—Lucille M. Phynes
*Attorney, Agent, or Firm*—Ostrolenk, Faber, Gerb & Soffen

[57] ABSTRACT

The invention involves a pressurized package containing an aqueous latex paint which is discharged from a collapsible piston within the pressurized container by the action of a propellant under pressure, and wherein the stream of paint discharging upon opening of the valve of the container is broken up by a mechanical breaker before being discharged through the nozzle in the form of a fine spray or mist devoid of propellant. Means are provided in the form of a cap for the nozzle for reducing or substantially eliminating the space about the nozzle after use of portions of the contents of the package to prevent drying out of any paint adhering to the nozzle and thereby clogging the nozzle. The paint employed is an aqueous acrylic latex emulsion paint in which the pigment content ranges from 2% to 15%.

5 Claims, 7 Drawing Figures

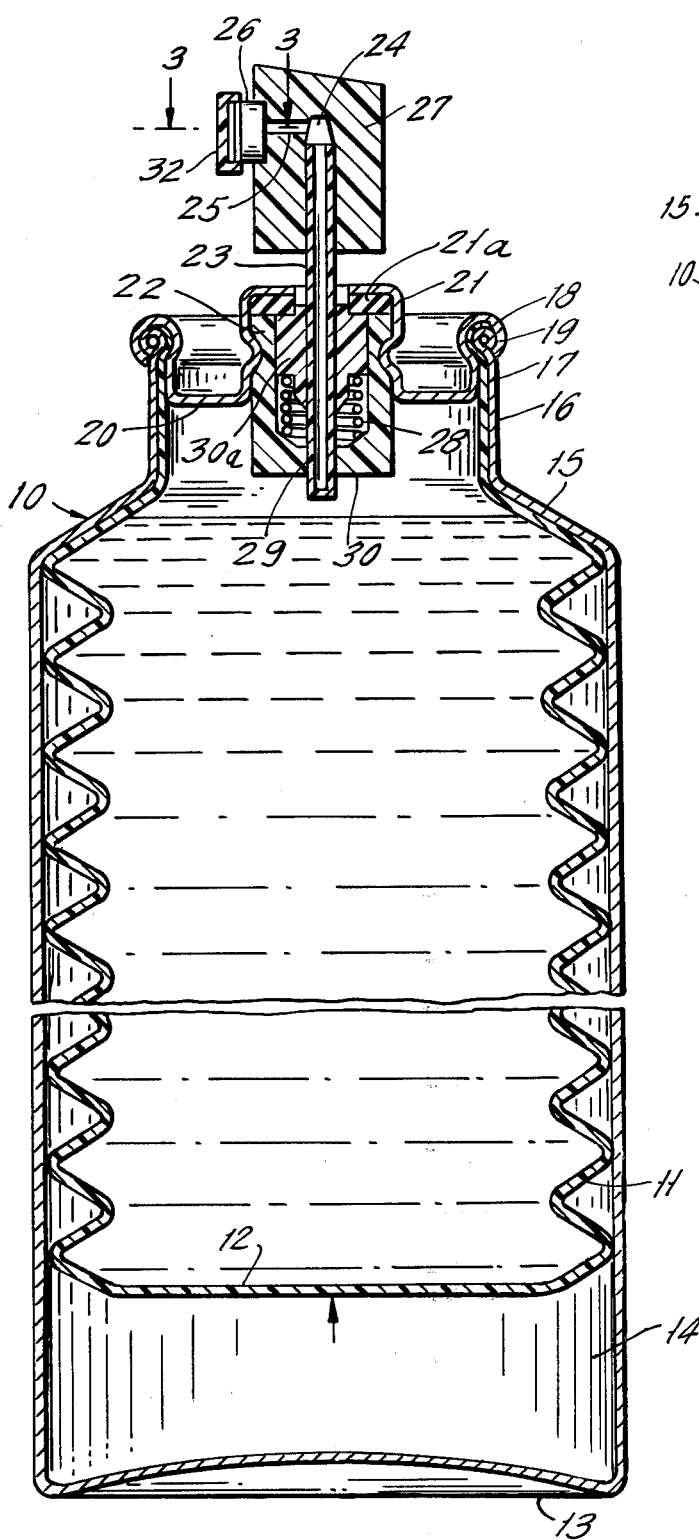

AEROSOL DISPENSED LATEX PAINT AND PACKAGE CONTAINING THE SAME

This application is a continuation in-part of my now abandoned application Ser. No. 168,916, filed Aug. 4, 1971.

The present invention relates to a pressurized package for an aqueous acrylic emulsion paint for discharge in the form of a spray, and to an improved container for effecting discharge of the emulsion without admixture with the propellant.

Latex paints have not been successfully incorporated in aerosol or pressurized cans for commercial sale for discharge in the form of a spray devoid of propellant and substantially free from the foaming, which makes uniform application difficult or even impossible, because it has been found that the paint employed could not be atomized at the permissible pressures without entrained propellant and/or that after each use the paint would dry or congeal in and about the nozzle and make further use of the dispenser difficult or even impossible.

I have found that the difficulty encountered by reason of foaming and clogging of the nozzle of the aerosol (pressurized) can containing the latex paint can be overcome by the use of a special formulation for the paint and by the use of a specially constructed piston type of pressurized aerosol can. In this type of can, the propellant does not mix with the discharged paint, but acts instead against a bellows-like piston which keeps the propellant separate from the latex paint. Furthermore, and in accordance with the invention, the nozzle is so shaped as to receive a snugly fitting cap which greatly reduces or practically eliminates an air space, which may be termed an evaporation space, about the discharge orifice of the nozzle, so that evaporation is minimal or does not occur at all, and any liquid left in the nozzle or adhering about its orifice remains in liquid form and does not dry out to cause a deposit of gummy or solid material. Also, by the provision of an atomizing attachment at or in advance of the nozzle orifice, atomization of the paint is accomplished without the aid of entrained or dissolved propellant. These features, namely, the special paint formulation, the use of a piston type pressurized dispenser and the application of a cap to the discharge orifice of the nozzle which discourages evaporation of the paint, and especially together with the atomizer, have made it possible to discharge a latex paint in the form of a spray or mist through the narrow nozzle orifice of an aerosol can while preventing clogging of the nozzle by dried paint.

In accordance with the invention, the space about the nozzle and within the cap when the aerosol pressurized dispenser is not in use is made as small as possible so that a minimum of the water will evaporate into such space from the paint adhering to the nozzle after use of the dispenser. This space, the "evaporation space," is reduced to a minimum by suitable construction of a cap which is fitted over the nozzle after use of the dispenser and can be made to enclose an evaporation space of very small volume. Preferably, the cap is provided with a conical projection which fits into the nozzle orifice, and thereby reduces the evaporation space practically to zero.

The invention will be further described with the aid of the accompanying drawing forming part of this specification and in which FIG. 1 is an external perspective view of a pressurized container or can constructed in accordance with the invention;

FIG. 2 is an enlarged central vertical section along the line 2—2 of FIG. 1;

Figure 5:
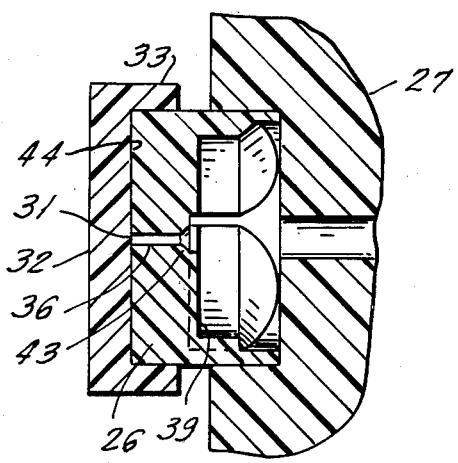
Figure 6:
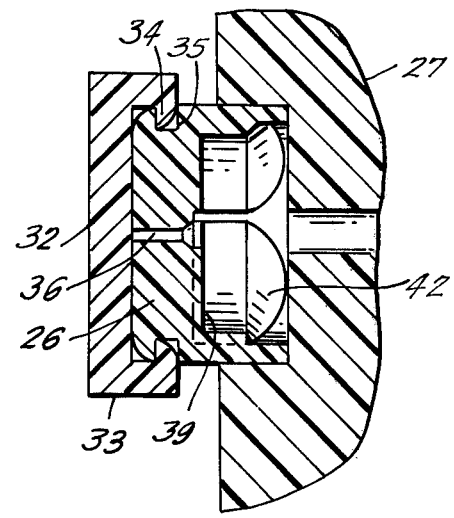
Figure 7:
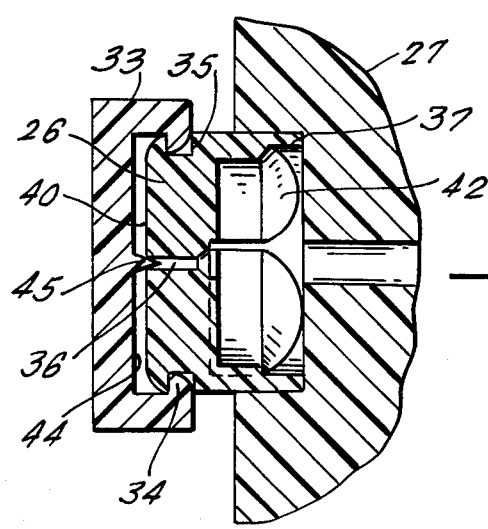

FIGS. 5, 6, and 7 illustrate further embodiments of the invention.

Referring to the drawings, there is shown at 10 an aerosol (pressurized) can of the type provided interiorly thereof with a collapsible bellows type of piston 11 made of any suitable pliable material which is non-reactive toward the paint composition contained therein or the propellant employed as hereinafter described, polyvinyl chloride, polyethylene, and natural and synthetic rubbers being examples of such suitable materials.

The piston 11 has a relatively flat bottom wall 12 and between such wall and the bottom 13 of the can there is provided a space 14 into which has been charged a propellant having a boiling point such that at approximately room temperature (70° F.) there is formed a vaporous or gaseous atmosphere of about 55 lbs./sq. in. which acts against the bottom 12 of the piston to place the contents of the piston under pressure.

The upper portion of the can is inclined as indicated at 15 and terminates in a cylindrical portion 16 whose free end is crimped, along with the upper end 17 of the piston, to provide a bead 18 in known manner. About this bead there is bent the upper end of an annular cap 20 of U-shaped cross-section whose inner wall 21 is sealed against a relatively soft, flexible washer 21a resting on and sealing the upper end of a fixed U-shaped plastic valve body 22.

Fixed to the valve body 22 is a tube 23, closed at its bottom end and leading into a chamber 24 within the depressible button or finger-piece 27, the chamber being connected by a duct 25 with a nozzle head 26, which is force fitted into a counterbore in the button. The button is depressible against the resistance of a spring 28 disposed between the bottom of the valve body and a guide block 30a slidable within the valve body and fixed to the tube 23. Upon removal of the cap 32, and depression of the button, a lateral opening 29 in the tube 23 is lowered out of registry with the bottom portion 30 of the valve body 22, and thus into communication with the upper part of the piston into which the paint has been raised upon rise of the bottom of the piston. The paint contained within the piston is discharged through tube 23 and nozzle orifice 31 (FIG. 3) into the atmosphere. The discharge continues so long as the button is depressed and until the piston is collapsed to the maximum extent.

The construction of the valve which operates to allow paint under pressure to be discharged through tube 23 can be of any known type and the construction shown in the drawing is presented only by way of example.

Figure 3:
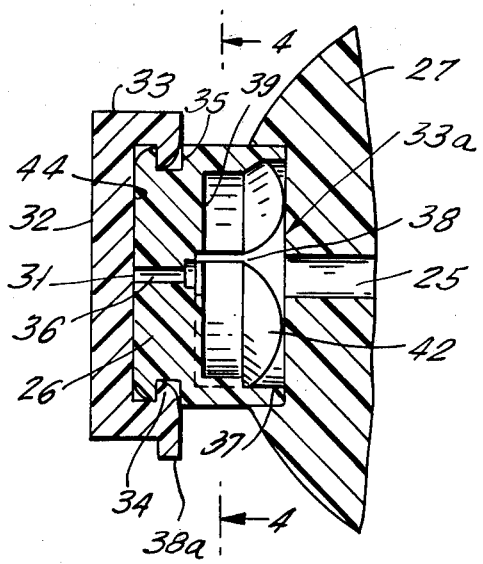
FIG. 3 is an enlarged horizontal section through the nozzle of the aerosol can and is taken along the line 3—3 of FIG. 2 looking in the direction of the arrows.

In accordance with the invention, the cap 32 is so constructed, as shown for example in FIG. 3, that it closely embraces the nozzle head and closes the nozzle orifice. The cap is made of resilient plastic material which is not reactive toward the paint composition and may be formed, as illustrated, of a flat portion having an annular extension 33 terminating in an inwardly extending flange 34 which snape into an annular recess 35 in the nozzle head 26, which itself may be formed of rigid plastic, and may have a removable tab 38a.

Figure 4:
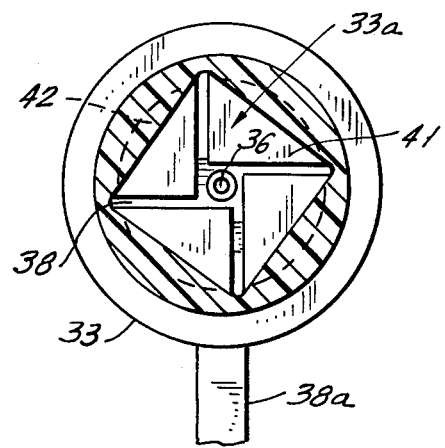
FIG. 4 is a vertical section along the line 4—4 of FIG. 3.

In a further development of the invention, I provide a mechanical breaker or baffle 33a which operates to effect a pre-atomization of the stream or jet of paint by breaking up the stream before it enters the nozzle passageway 36, so that the broken-up stream emerges from the orifice 31 as a spray or mist. As shown in FIGS. 3 and 4, the stream of paint delivered by the duct 25 passes through the rear counterbore 37 of the nozzle body and becomes distributed into a number of narrow approximately radial grooves 38 by which the stream is broken up and is then directed into the nozzle passageway 36.

The breaker is formed in the front wall 39 of the nozzle head and is in the form of a preferably square body 40 which may be molded integrally with or secured to the front end wall of the nozzle. The body is traversed by the grooves 38, preferably four, which communicate with the passageway 36 and divide the said body into four more or less triangular sections 41 from whose edges adjacent to the outer wall of the nozzle head there rise flat walls which are connected by arcuate portions 42 with the wall of the counterbore. These grooves or channels effect both thorough mixing of the jet of paint and also contribute to the break-up of the jet as it enters the nozzle passageway 36.

As shown in FIGS. 3 and 4, the duct 25 is of larger diameter than the nozzle passageway 36, and there is an abrupt reduction in the diameter of the paint stream as it enters passageway 36. In the construction shown in FIG. 5, the transition from the passageway leading from the tube 23 into the nozzle passageway 36 is gradual, there being a conical transition region 43 between the two passageways. There is shown also a cap which is of simple cylindrical form and fits over the nozzle head so closely that the available evaporation space is practically zero. FIG. 6 shows the nozzle arrangement of FIG. 5 associated with a cap 32 of the type shown in FIG. 3.

FIG. 7 shows a cap whose interior surface 44 does not abut against the outer surface of the nozzle head, but is slightly spaced therefrom. However, there is provided at the center of the cap a conical projection 45 which fits into the nozzle orifice and completely seals the same, thereby preventing evaporation of any paint remaining in the nozzle passageway 36.

The nozzle body is force-fitted into a suitable bore in the thumbpiece 27 in such manner that the counterbore is bounded at one end by the four approximately triangular portions 41, but is open at its opposite end where it communicates with the hollow stem or tube 23 of the aerosol valve.

Despite the absence of dissolved or entrained propellant, as is the case with the more common types of aerosol dispensers, I obtain a high degree of atomization of the discharged paint by the aid of the above described mechanical breaker, which may be responsible for as much as 90% of the atomization of the paint. With the mechanical breaker, I employ nozzle orifice diameters ranging from about 0.016 inch to about 0.020 inch. The most suitable size of nozzle orifice will usually be determined by the viscosity or pigment content of the paint.

Any suitable propellant can be employed which places the contents of the collapsible piston under a pressure of a maximum of about 55 lbs./sq. in. at 70° F. A suitable mixture is "Freon 12" (70%) and "Freon 11" (30%). A mixture of "Genetron 11" and "Genetron 12" (Allied Chemical Co.) can also be employed.

The aerosol dispensed paint can yield a flat, semi-gloss, or high gloss surface and the paint can be clear (i.e., a varnish), and it may be in the form of a metallic paint wherein the pigment can consist entirely or in part of aluminum, gold, copper, bronze, or other metallic powder. The particle size in each case will, of course, be such that the paint will readily pass through the nozzle of selected orifice diameter. In the case of the clear aqueous varnish, I prefer one having a low solids content, such as one containing about 15 to 20% of varnish resin.

The paints preferably have viscosities of about 10 to 60 sec., as measured on the No. 4 Ford cup (20 to about 209 CPS.).

The type of latex paint to be packaged in a piston type of pressurized can above described is represented by way of example by the following composition:

EXAMPLE 1

Latex Aerosol Redwood Spray:

This aqueous spray is composed of the following substances in approximately the proportions indicated:

|  | % By Weight | % By Weight |
|---|---|---|
| Pigment |  | 6.18% |
| Composed of |  |  |
| 1. Synthetic Iron Oxide | 72.72 |  |
| 2. Attapulgus Clay | 27.28 |  |
| Vehicle |  | 93.82% |
| 3. Water | 62.90 |  |
| 4. Surfactant | 1.02 |  |
| 5. Antifoam Agent | 0.22 |  |
| 6. Ester Alcohol | 0.95 |  |
| 7. Preservative | 0.11 |  |
| 8. Resin | 34.80 |  |

Examples of the substances listed above and their properties are as follows:

PIGMENT

1. Synthetic Iron Oxide: Jet milled synthetic red iron oxide Code #J3110 Specific gravity 5.5 Oil absorption 20 Hegman dispersion index 6½ Density (lb/gallon) 42.90 Permanence index Min. 9.9
2. Attapulgus clay, sold by Minerals and Chemical Division of Engelhard Available as "Attagel" 40 or 50 Fine 2. Attapulgus clay (continued):

| Average particle size in microns | 0.14 |
|---|---|
| Free moixture as produced |  |
| (wt. % at 220° F.) | 12.0 |
| Lb. per gal. | 19.70 |
| Color: Light Cream |  |

VEHICLE

3. Water: Tap water is satisfactory.
4. Surfactant: Igepal CTA 639 (General Aniline): (Polyoxyethylated p-nonylphenol.

| Aromatic, colorless liquid. |  |
|---|---|
| Density at 25° C | 1.06 |
| Flash point | 535 – 555° F. |
| Cloud point | 126 – 133° F. |

5. Antifoam Agent: Colloid 677 (Colloids Inc., Newark, N.J. 07114)

| | |
|---|---|
| pH 5.8 | |
| Wt./gal. at 70° F. | 7.35 lbs. |

Physical state: Pale yellow liquid.

6. Ester Alcohol (coalescing agent): "Texanol" (a water-immiscible 12-carbon ester-alcohol) (Eastman Chemical Products, Inc.)

| | |
|---|---|
| Specific gravity, 20°/20° C | 0.945 – 0.955 |
| Carbonyl, as C=O, wt. % | 0.4% max. |

7. Preservative: "Dowicil 100" (Dow Chemical Co.) Non-phenolic antimibrobial agent (1-[3-chlorallyl]-3,5,7 triaza-1-azoniaadamantane chloride). ("Dowicil 100" preservative has been registered with the United States Department of Agriculture in conformance with the Federal Insecticide and Fungicide Act #464-327.)

8. Resin: AC 490 (Rohm & Haas) 100% acrylie emulsion (46% solid acrylic resin); or Celanese CL-222, 100% vinyl-acrylic emulsion (55% solids). AC 490 (or Rhoplex AC-490) is an aqueous acrylic emulsion containing lower alkyl esters of acrylic acid and methacrylic acid wherein the lower alkyl group has up to four carbon atoms, a small amount of an unsaturated carboxylic acid, and a minor amount of another ethylenically unsaturated compound. Celanese CL-222, more specifically, is a stabilized, non-ionic, high molecular weight, fine particle size polyvinylacetate-acrylic copolymer emulsion. The viscosity range is 15 sec. to 60 sec. (measured by the No. 4 Ford cup).

For redwood finishes, I prefer to employ as the surfactant, as above indicated, polyoxethylated p-nonylphenyl. For other latex aerosol paints, the surfactant or wetting agent can be any known and suitable substance, depending upon the desired color of the paint. The wetting agent acts to reduce the surface tension of the paint. Suitable other surfactants or wetting agents are "Tamol 731" and "Tamol 850" (Rohm & Haas), pigment dispersants for aqueous systems, and "Igepol CO 630" (General Aniline), a nonylphenoxypoly (ethyleneoxy) ethanol having a hydrophylic number of 63 and a concentration of 99 plus %. For redwood finishes, General Aniline's "CTA 639" yields exceptionally good results.

In general, I prefer to employ an aqueous vinyl-acrylic vehicle whose total solids content is about 30% by weight and whose viscosity is 20–25 sec. on the No. 4 Ford cup. The gloss has a value of 60–70, No. 60° on the Gardner scale. The particle size of the pigment should not exceed 0.2 to 0.3 microns.

By the use of the above described aerosol dispenser, the water base paint is discharged without foaming, such foaming being a serious objection when dispensing a latex paint with a propellant that is dissolved in the paint, the foaming action preventing a uniform rate of flow.

The aerosol can above described can be one sold as "Sepro" can (Continental Can Company). With its use, a smaller amount of propellant is required than the more commonly employed aerosol dispensers wherein the propellant is mixed with the product to be dispensed. The aerosol can above described is operative in any position and the product is maintained separate from the propellant and is kept out of contact with the metal of the can. Approximately 94–97% of the contents of the collapsible piston are dispensed. As is known, the propellant is injected through an access opening at the bottom of the can, which is then closed with a special valve or grommet.

The pigment content should be kept relatively low, namely, about 2 to 15%. This provides an additional safety factor, in that evaporation of residual paint can be tolerated to a certain extent without causing gelling or breaking of the paint emulsion.

As will readily be understood, the selected viscosity within the range above disclosed will be related to the nozzle orifice diameter in such manner that a steady and uniform flow of atomized paint will be obtained on opening of the valve. The optimum viscosity for a given nossle orifice diameter, and likewise the optimum orifice diameter for a given viscosity can be determined by simple experiment.

Although I have shown the grooves or channels 38 as straight, they may also be curved in order to increase the whirling and break-up action on the stream of paint before it enters the passage 36.

I claim:

1. An aqueous polyvinyl acetate methyl acrylate copolymer emulsion paint for use with a pressurized container, wherein the paint is disposed within a collapsible piston housed within the pressurized container, a propellant vapor or gas of elevated pressure filling the space between the collapsible piston and the container, and acting against the bottom of the piston, said container having a valve communicating with the interior of the piston and through which the contents of the piston are discharged as the piston is compressed under the action of the propellant as the valve is opened, said valve being connected to a discharge nozzle, the polyvinyl acetate and methyl acrylate components of the copolymer being present in the proportion of 80:20, and wherein the paint comprises approximately 2–15% of a pigment suspended in approximately 98–85% of a vehicle comprising predominantly water and said copolymer, the copolymer constituting approximately 35% of the vehicle, said paint containing also small proportions of a surfactant and an anti-foam agent, and having a viscosity in the range of 10 to 60 sec., as measured on the No. 4 Ford cup (20 to about 209 cps.) at room temperature, said paint being discharged by the nozzle in the form of a spray from the collapsing piston on opening of the valve and substantially without foaming and thereby yielding a substantially uniform coating owing to the absence of the propellant in the paint.

2. An aqueous emulsion paint as defined in claim 1, wherein the pigment is composed of approximately 70–75% of a synthetic iron oxide and 30–25% of attapulgus clay.

3. An aqueous emulsion paint as defined in claim 1, wherein the pigment content is 6.18%, the viscosity is 20–25 sec. on the No. 4 Ford cup, and wherein the average particle size does not exceed 0.3 microns.

4. A latex paint according to claim 1, wherein the vehicle is composed to the extent of approximately 35% of an acrylic resin.

5. The combination with the emulsion as defined in claim 1, of a pressurized container for dispensing the emulsion, said container comprising an outer cylindrical wall within which there is disposed a collapsible piston, the emulsion being contained in the piston, a propellant under pressure filling the space between the said wall and the collapsible piston and acting against the bottom of the piston, said container having a valve communicating with the interior of the piston and through which the contents of the piston are discharged as the piston is compressed under the action of the propellant as the valve is opened, said valve being connected to a discharge nozzle.

* * * * *